F. M. PARKS AND F. A. FINCH.
MACHINE FOR PREPARING FARM PRODUCTS.
APPLICATION FILED MAR. 22, 1919.
1,415,191.
Patented May 9, 1922.
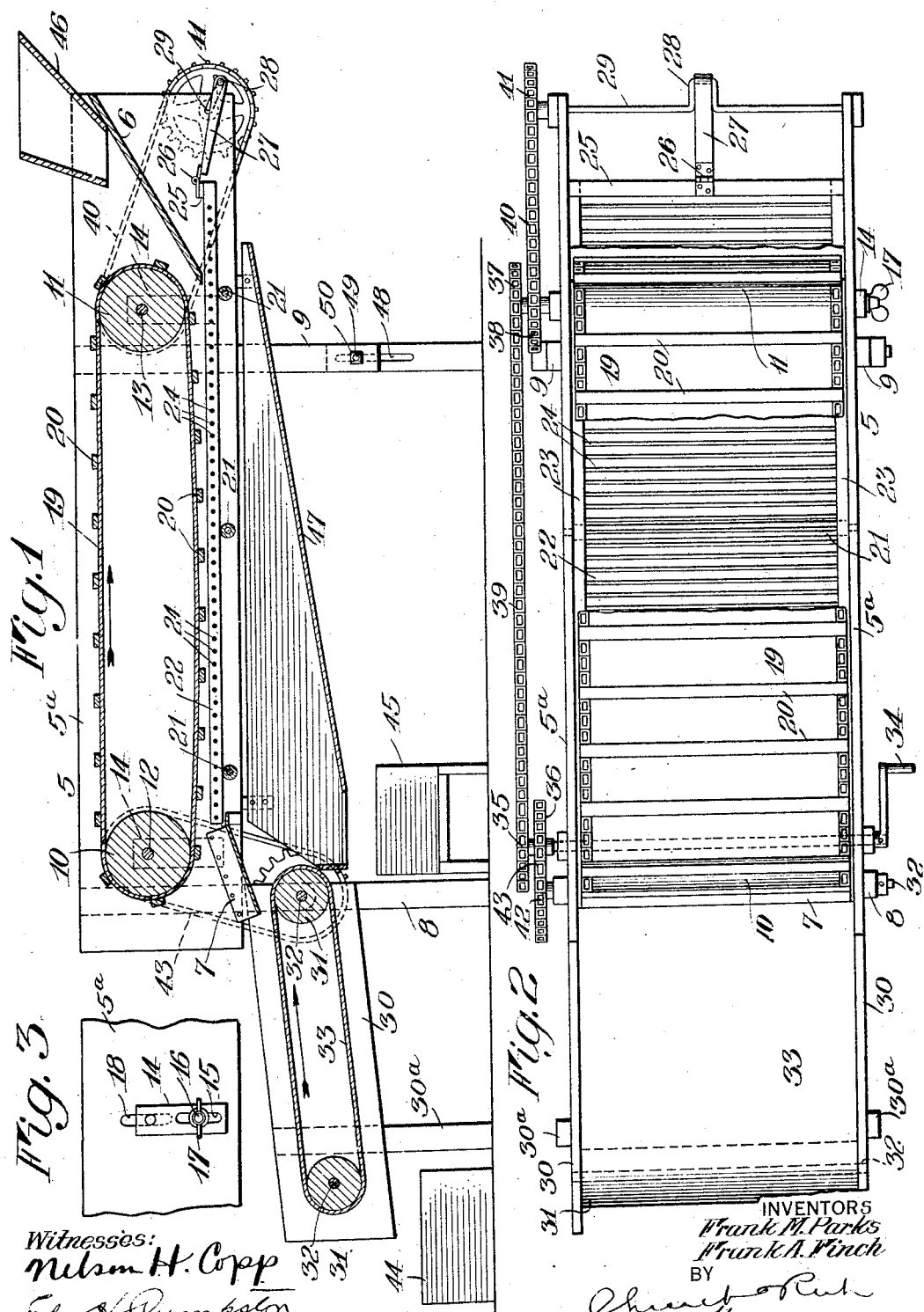
INVENTORS
Frank M. Parks
Frank A. Finch
BY
their ATTORNEYS
Witnesses:

UNITED STATES PATENT OFFICE.

FRANK M. PARKS, OF NORTH COHOCTON, AND FRANK A. FINCH, OF ATLANTA, NEW YORK, ASSIGNORS TO HYATT C. HATCH, OF ATLANTA, NEW YORK.

MACHINE FOR PREPARING FARM PRODUCTS.

1,415,191.        Specification of Letters Patent.      Patented May 9, 1922.

Application filed March 22, 1919. Serial No. 284,384.

*To all whom it may concern:*

Be it known that we, FRANK M. PARKS, of North Cohocton, in the county of Steuben, State of New York, and FRANK A. FINCH, of Atlanta, in the county of Steuben and State of New York, have invented certain new and useful Improvements in Machines for Preparing Farm Products; and we do hereby declare the following to be a full, clear, and exact description of the same, reference being had to the accompanying drawings, forming a part of this specification, and to the reference numerals marked thereon.

The invention relates to machines for preparing or treating farm products and other materials to improve them for market, and more particularly, to machines for cleaning, husking, sprouting or otherwise preparing onions, potatoes and similar materials, one object of the invention being to provide a machine of this variety which accomplishes mechanically the proper treatment of the material to prepare it in the manner desired, thereby saving the time and expense of performing the same work by hand, and also improving the process. Another object is the provision of a machine which accomplishes mechanically the desired treatment and, at the same time, efficiently handles the material being treated to the same advantageous ends. Still a further object is a machine of this character which is adaptable to various grades of a given material or product and also to a variety of different products. To these and other ends the invention resides in certain improvements and combinations of parts all as will be hereinafter more fully described, the novel features being pointed out in the claims at the end of the specification.

In the drawings:

Figure 1 is a central vertical elevation of the machine.

Figure 2 is a top plan view of the same, parts being broken away for purposes of illustration, and Figure 3 is a detail view of the bearing adjusting means.

Similar reference numerals throughout the several views indicate the same parts.

In the present embodiment, which is selected merely by way of illustration of the principles of the invention, there is preferably provided a frame indicated generally at 5, having side pieces 5ª which are attached to each other and held in spaced relation by means of members 6 and 7 adjacent their opposite ends, and the frame is supported at its corners by legs 8 and 9.

Extending transversely of the frame between the side pieces 5ª and near the ends thereof are parallel rolls 10 and 11 preferably supported on spindles 12 and 13, respectively, journaled at their ends in the side pieces 5ª, the roll 10 being revoluble on its spindle 12 while the roll 11 is fixed to the spindle 13 for a purpose hereinafter described. Spindles 12 and 13 are preferably journaled at their ends in adjustable bearings of any suitable construction, supported on the side pieces 5ª, that adopted in the present instance comprising a bearing formed in an adjustable block 14 provided with an elongated slot 15 through which projects a supporting stud 16 fixed in the adjacent side piece 5ª and carrying at its projecting end a wing nut 17. It will be apparent from this construction that bearing blocks 14 and the spindles carried thereby may be adjusted vertically to raise or lower the rolls, and clamped in proper position by turning the nut 17, the side pieces 5ª having therein slots 18 providing play for the ends of the spindles which extend through the side pieces.

Carried on the rolls 10 and 11 is a belt 19 preferably of fabric or other suitable material of a width slightly less than the space between the side pieces 5ª, the exterior side of the belt having fixed thereon transversely extending cleats or ribs 20 for engagement with the material to be treated. The form of the belt, of course, may be varied to suit conditions.

Extending across the frame 5 at its bottom are a plurality of bearing rollers 21 having spindles journaled in the side pieces 5ª, these rolls supporting a rectangular frame or bed 22 somewhat shorter in length than the frame 5, but of substantially the width of the inside of the latter and comprising side bars 23 preferably connected by a series of spaced rods 24 forming a grating, although for some purposes, a different form of construction for the frame 22 may be found advantageous. Frame 22 is provided at one end with a cross bar 25 to which is hinged at 26 a connecting rod 27 having a bearing at its other end embracing crank 28 formed in a shaft 29 journaled at its ends in the sides of the frame 5. When shaft 29 is rotated by means described later, frame 22 is given a reciprocating motion on the rollers 21 by means of the connecting rod 27.

At the end of the machine opposite shaft 29 there is provided a pair of side members 30 supported at their outer ends by legs 30ª and at their inner ends by a connection with the legs 8 of frame 5. Extending transversely of these members at their ends are parallel rolls 31 fixed on spindles 32 journaled at their ends in the members 30, the inner spindle being extended and journaled also in the legs 8, forming the support for the members 30 mentioned above. These rolls carry a belt 33 of fabric or other suitable material slightly less than the space between the members 30 and preferably inclined somewhat upwardly toward the frame 5 extending below and into proximity with the lower edge of the member 7.

The actuating means for driving belts 19 and 33 and the reciprocating frame 22 comprises, preferably, a crank handle 34 fixed on one end of spindle 12, the other end of which has fixed thereon exteriorly of frame 5 a pair of sprocket wheels 35 and 36. Spindle 13 has fixed thereon a pair of sprockets 37 and 38, corresponding to sprockets 35 and 36, respectively, and connecting wheels 35 and 37, is a driving chain 39. Sprocket wheel 38 is connected by a chain 40 with a sprocket wheel 41 fixed on the corresponding end of shaft 29. The inner spindle 32 has fixed thereon a sprocket wheel 42 and a chain 43 connects wheels 36 and 42.

It is apparent that when crank 34 is turned in a clockwise direction, the roll 11 will be driven by chain 39 and will move belt 19 in the direction indicated by the arrow, Figure 1, rotating roll 10 which is loose on its spindle for this purpose. Also shaft 29 will be rotated by the action of chain 40 and by means of the connecting rod 27, will impart a reciprocating movement to frame 22, the latter being so arranged that its ends do not move inwardly beyond the inner ends of the respective members 6 and 7. Rolls 10 and 11 are adjusted by the means described above so that the lower side of belt 19 and the bars 24 of frame 22 engage from opposite sides with suitable pressure the products or material to be treated, the continuous movement of the belt and the reciprocating movement of the frame acting to alternately advance or convey the material received between them while they are moving in the same direction and to roll over, rub or otherwise manipulate the material while the frame is moving in a direction opposite to that of the belt.

The material which is conveyed in the above manner to the end of frame 22 is preferably discharged upon the inclined member 7 down which it flows until dropped on the upper surface of belt 33 which is moving in the opposite direction. The inclination of this belt is preferably such that the fully formed onions, potatoes or other products being treated, continue their motion, rolling down the belt until discharged over its lower end into a receptacle 44, while imperfectly formed products, not being of rounded form, together with husks, sprouts, dirt, etc. are stopped by the belt and carried upwardly by it and discharged over its upper end into a receptacle 45, thus serving to separate the valuable portion of the products from the refuse.

A receptacle or hopper is provided at 46 for receiving the material to be prepared, having an inclined bottom discharging onto the member 6 which is inclined to allow the material to flow downwardly onto the frame 22 adjacent the end of belt 19 which engages and conveys it along with the reciprocating frame in the manner described. Below the frame 22 and supported on the frame 5 is a catch plate 47 having an inclined bottom arranged to catch refuse material and dirt which drops between the bars of frame 22 during the working or treating process.

Legs 9 of the frame 5 are preferably adjustable in length so that the height of this end of the frame may be varied to provide an inclination for belt 19 and frame 22 if found desirable in working certain materials, any suitable construction being employed for this purpose as for example, a slot 48 in one portion of the leg and a bolt 49 fixed in the other portion and extending through this slot, a nut 50 being provided on the end of the bolt for clamping the portions of the leg together after adjustment.

It is apparent from the drawings and the above description of the construction that when material is placed in the hopper 46 and crank 34 is rotated, the relative movements of belt 19 and frame 22 will convey the material along, and rub and work it to effect the desired result, the improved material being eventually discharged on the inclined member 7 while refuse portions and foreign matter drop through the bars of frame 22 onto the plate 47 and eventually into the waste receptacle 45. The material sliding down member 7 will drop upon the inclined surface of belt 33, the valuable portion rolling down the belt and into receptacle 44, while the refuse portion is carried with the belt and discharged into receptacle 45.

The invention thus mechanically accomplishes the working or treatment of the material in a manner rendered efficient by the provision of appropriate working surfaces on belt 19 and reciprocating frame 22, with a regulated pressure of these parts on the material, at the same time continuously moving it from the receiving to the discharge end of the machine where the belt 33 mechanically separates the valuable portion of the material from the waste portion and discharges these portions into separate receptacles. By the vertical adjustment provided for belt 19, the machine is adapted to handle products of different sizes as well as of different kinds, which adaptation may be assisted by inclining frame 5 if found desirable.

The described construction and arrangement of parts provides a machine which accomplishes the desired operation quickly and efficiently, and while the present embodiment is hand operated, it may obviously be power driven instead, and also employed as well in conjunction with other machines for subjecting the products to successive grading, cutting, or other preparing processes, as found convenient.

We claim as our invention:

1. In a machine of the class described, a pair of spaced surfaces arranged to receive therebetween at one end the products to be treated and to maintain a pressure on the same from opposite sides, one of said surfaces being perforated for the discharge of refuse, actuating means effecting continuous movement of one of said surfaces and a relatively parallel reciprocating movement of the other to rub and clean the products and advance the same therealong, and a separator arranged to receive the products discharged from said surfaces.

2. In a machine of the class described, a supporting frame, spaced rollers thereon, a relatively wide belt surface carried by said rollers, a member movably carried by said frame below and spaced from said surface and provided with perforations for the discharge of refuse, said surface and member being arranged to receive therebetween at one end the products to be treated and to maintain a pressure on the same from opposite sides, and actuating means effecting relative movement of said surface and member to rub and clean the products and advance the same from end to end thereof.

3. In a machine of the class described, a supporting frame, spaced rollers thereon, a flexible belt on said rollers affording a yieldable, flat rubbing surface, a grating movably carried by said frame below and in spaced relation with said belt, said belt and grating being arranged to receive therebetween at one end the products to be treated and to maintain a yielding pressure on the same from opposite sides, and actuating means for rotating said belt and reciprocating said grating to rub and clean the products and advance the same therealong.

4. In a machine of the class described, a supporting frame, spaced rollers thereon, a flexible belt on said rollers affording a yieldable, flat, rubbing surface, a member on said frame below and spaced from said belt, said belt and member being arranged to receive the products to be treated at one end thereof and to maintain a yielding pressure on the products from opposite sides, adjusting means for varying the space between said belt and member, feeding means at one end of said parts to supply the products therebetween, and actuating means for rotating said belt and reciprocating said member parallel therewith to rub and clean the products and discharge the same at the other end thereof.

FRANK M. PARKS.
FRANK A. FINCH.